United States Patent
Thomas et al.

(10) Patent No.: US 7,384,357 B2
(45) Date of Patent: Jun. 10, 2008

(54) SPEED REDUCTION GEAR TRAIN WITH PLANETARY DIFFERENTIAL FOR ELECTRIC MOTOR AXLE DRIVE

(75) Inventors: Steven G. Thomas, Bloomfield Hills, MI (US); David A. Janson, Plymouth, MI (US); Matthew D. Hammond, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 11/429,550

(22) Filed: May 5, 2006

(65) Prior Publication Data

US 2007/0259747 A1  Nov. 8, 2007

(51) Int. Cl.
*F16H 37/06* (2006.01)

(52) U.S. Cl. .......................... 475/5; 475/204; 475/205; 475/149; 475/150; 475/151; 180/65.2; 180/65.6; 180/247; 180/248; 180/250

(58) Field of Classification Search .................... 475/5, 475/149, 150, 151, 204, 205; 477/3; 180/65.2, 180/65.6, 247, 248, 249, 250
See application file for complete search history.

(56) References Cited

U.S. PATENT DOCUMENTS

| | | | |
|---|---|---|---|
| 5,443,130 A | 8/1995 | Tanaka et al. | |
| 5,558,175 A | 9/1996 | Sherman | |
| 5,845,732 A | 12/1998 | Tanaguchi et al. | |
| 6,468,175 B1 | 10/2002 | Lehongre | |
| 6,484,834 B2 | 11/2002 | Bowen et al. | |
| 6,540,636 B2 | 4/2003 | Amanuma et al. | |
| 6,604,591 B2 | 8/2003 | Bowen et al. | |
| 6,692,394 B2 | 2/2004 | Takenaka | |
| 6,830,529 B2* | 12/2004 | Phelan et al. | 475/221 |
| 6,896,080 B2 | 5/2005 | Takenaka | |
| 2005/0115750 A1* | 6/2005 | Takami et al. | 180/65.2 |
| 2006/0081406 A1* | 4/2006 | Kano et al. | 180/65.6 |
| 2006/0293141 A1* | 12/2006 | Sharma et al. | 475/204 |
| 2007/0093341 A1* | 4/2007 | Supina et al. | 475/5 |

\* cited by examiner

*Primary Examiner*—David D. Le
(74) *Attorney, Agent, or Firm*—David B. Kelley; MacMillan, Sobanski & Todd, LLC

(57) ABSTRACT

An electric drive unit for a vehicle includes an electric motor, two output shafts, a first speed reduction planetary gearset driven by the motor, a second speed reduction gearset driven by an output of the first gearset, and a compound planetary differential gearset including an input driveably connected to the output of the second gearset, a first differential output driveably connected to the first output shaft, and a second differential output driveably connected to the second output shaft.

17 Claims, 3 Drawing Sheets

SPEED REDUCTION GEAR TRAIN WITH PLANETARY DIFFERENTIAL FOR ELECTRIC MOTOR AXLE DRIVE

BACKGROUND OF THE INVENTION

The present invention relates to a drive system for a motor vehicle. More specifically, the present invention relates to an electric motor drive unit for use in hybrid electric motor vehicles.

To reduce the volume of pollutants exhausted into the air by automotive powertrains driven exclusively by an internal combustion engine, hybrid powertrains that include an electric motor and an IC engine, which operate independently or and in combination, have been developed.

Hybrid electric powertrains are being developed for use in four-wheel drive vehicles such that the motor and the engine can transmit power to both a front set of driven wheels and rear set of driven wheels. Hybrid four-wheel drive systems, however, present packaging difficulties to the vehicle designer. When packaging an electric motor drive unit for a front axle or rear axle it is preferable to place the motor drive unit on the axle centerline for best packaging efficiency.

Packaging an electric motor on an axle and eliminating the need for a 90-degree bevel gear differential provides an electric hybrid powertrain with a substantial improvement in packaging efficiency. Performance improvement and better fuel economy accompany the packaging efficiency.

A need exists for hybrid electric powertrains applicable to four-wheel drive vehicles that use conventional powertrain components, minimize package space, and reduce manufacturing and assembly costs.

SUMMARY OF THE INVENTION

An electric motor drive unit described here provides an electric motor, compact gearsets and an inter-wheel differential mechanism, which facilitate packaging the traction motor and gearing on an axle centerline. The speed of the motor is reduced by about 8-10:1 through operation of two simple planetary gearsets. The vehicle's top speed and tire size help establish the maximum motor speed and the maximum speed of the gearing.

By using Beta ratios, i.e., the ratio of the pitch diameter of the sun gear to the pitch diameter of the ring gear, of about 2.0-2.5, the diameter of the electric motor drive unit is kept small, thereby allowing the gearsets to be nested inside of the rotor of the motor. This arrangement produces lower pinion speeds compared to those of comparable arrangements, yet the required package space is comparable.

The preferred embodiments provide a hybrid powertrain for a four-wheel drive vehicle. The design eliminates need for a 90-degree bevel gear differential and provides the best possible packaging efficiency, performance and fuel economy.

An electric drive unit for a vehicle includes an electric motor, two output shafts, a first speed reduction planetary gearset driven by the motor, a second speed reduction gearset driven by an output of the first gearset, and a compound planetary differential gearset including an input driveably connected to the output of the second gearset, a first differential output driveably connected to the first output shaft, and a second differential output driveably connected to the second output shaft.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
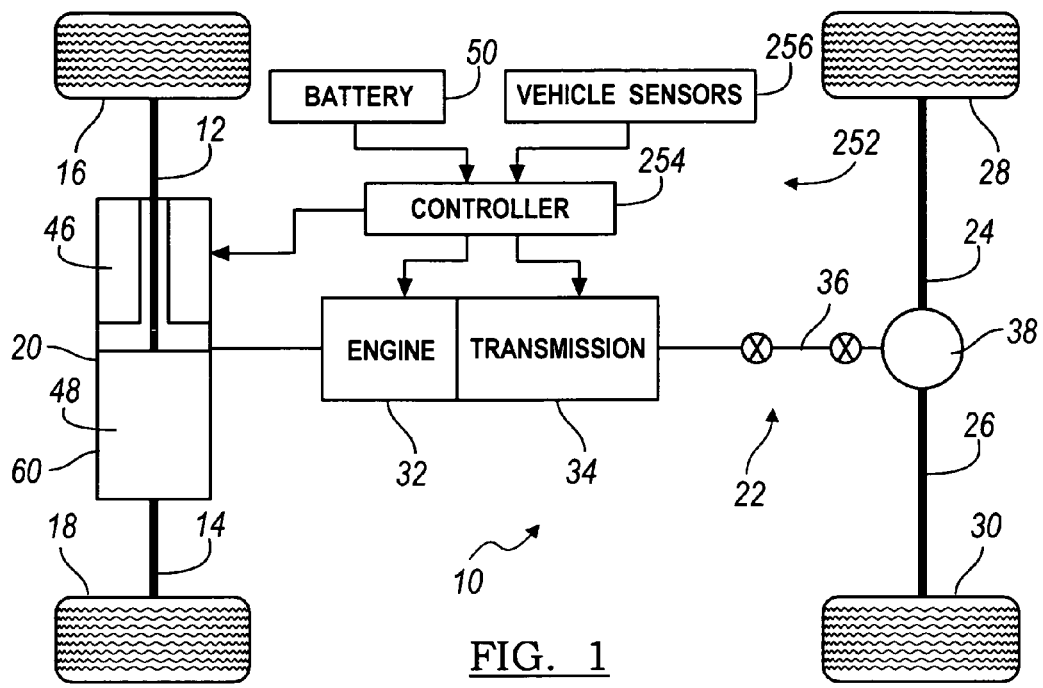
FIG. 1 is a schematic diagram of a powertrain for a hybrid electric vehicle, whose front half shafts are driven by an electric motor drive unit.

Referring first to FIG. 1, a powertrain 10 for a hybrid electric vehicle includes a front wheel drive system, which includes front half shafts 12, 14 driveably connected, respectively, to front wheels 16, 18, the axles being driven by an electric motor drive unit 20. The powertrain 10 also includes a rear wheel drive system 22, which includes rear axle shafts 24, 26, driveably connected to rear wheels 28, 30, respectively. The rear axle shafts may be replaced by half shafts. An internal combustion engine 32 drives the rear axles shafts 24, 26 through a transmission 34, a drive shaft 36, and an inter-wheel differential mechanism 38, which transmits power differentially to rear wheels 28, 30.

Figure 2:
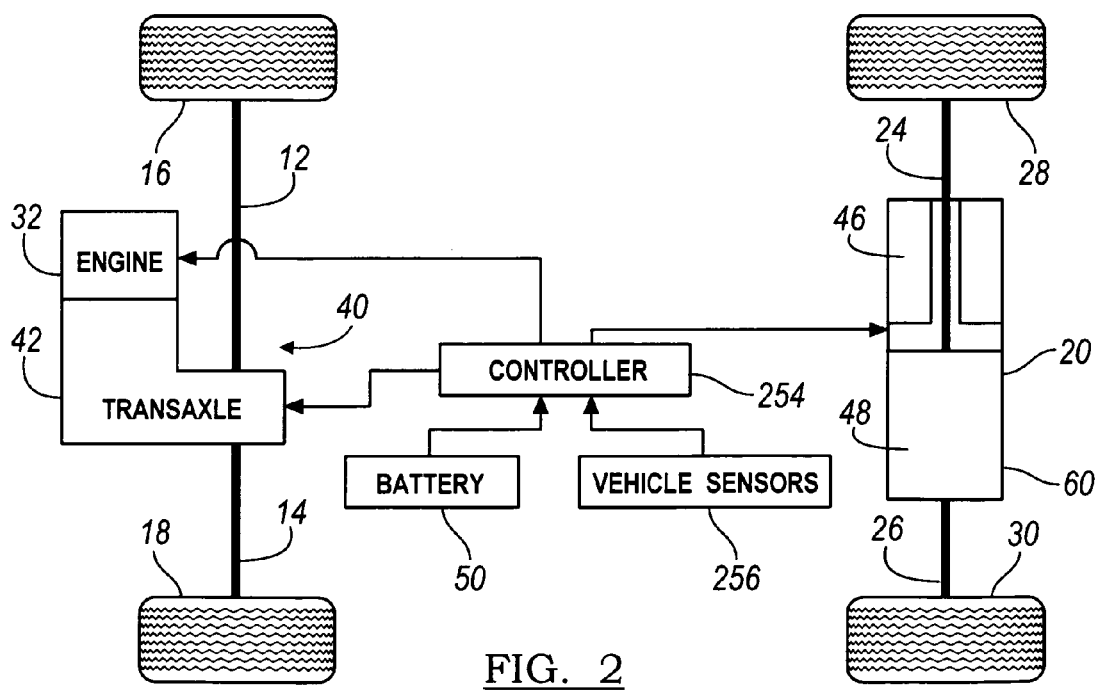
FIG. 2 is a schematic diagram of a powertrain for a hybrid electric vehicle, whose rear axle shafts or half shafts are driven by an electric motor drive unit.

FIG. 2 illustrates an alternative embodiment having a front drive systems in which the front wheels 16, 18 are driven by the engine 32, and a rear drive system in which the rear wheels 28, 30 are driven by the electric motor drive unit 20. In the embodiment of FIG. 2, the front wheel drive system 40 includes a transaxle 42, driveably connected between the output of the engine 32 and right and left, front half shafts 12, 14. The transaxle 42 includes a transmission and an inter-wheel differential mechanism and can be any of an automatic, manual or automated manual step change transmission, or a belt drive, chain drive or traction drive continually variable transmission. The rear wheel drive system includes the electric motor drive unit 20, which drives the rear axle shafts 24, 26 and rear wheels 28, 30. The rear axle shafts may be replaced by half shafts.

The hybrid powertrain includes two power sources, the IC engine 32 and an electric motor 46. The motor 46 is driveably connected to a gear unit 48 and is located in the electric motor drive unit 20 with a gear unit. The motor 46, which is connected to an electric storage battery 50, can operate in a drive state, a charging state, and an off state. When the motor operates in the drive state, the electric motor drive unit 20 functions as a motor drive unit, whose power source is an electric storage battery 50. When the motor operates in the charging state, the electric motor drive unit 20 functions as an electric generator and stores electric energy in the battery 50. When the motor operates in the off state, the electric motor 46 is inoperative and its motor shaft rotates freely.

Figure 3:
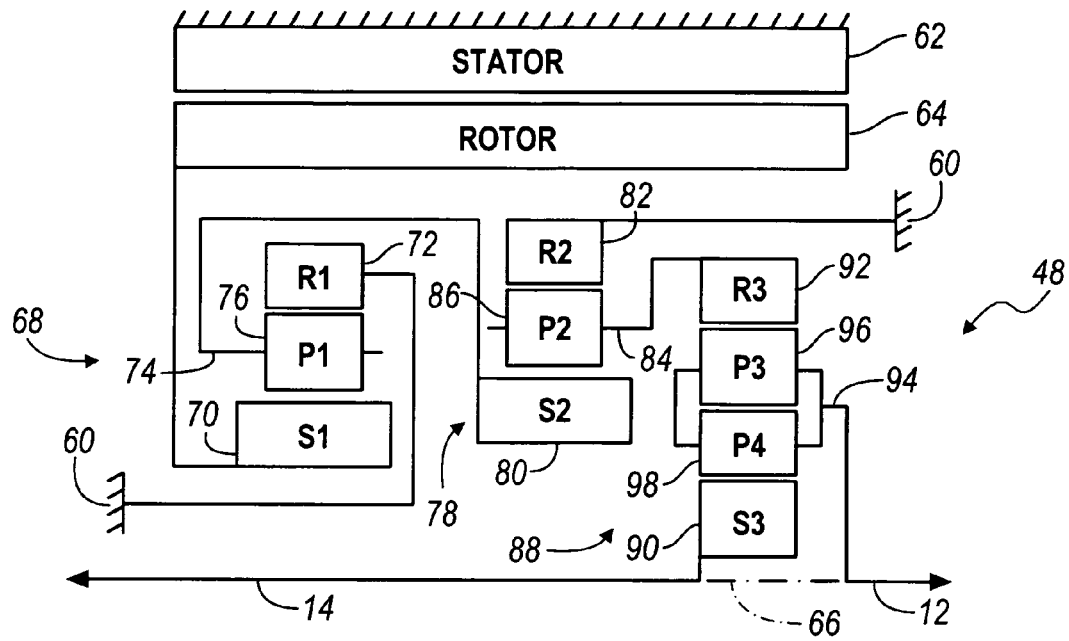
FIG. 3 is a cross section of the electric motor drive unit showing a first embodiment of the gear unit.

FIG. 3 illustrates the electric motor drive unit 20, which incorporates within its housing 60 the electric motor 46 and gear unit 48. FIG. 3 illustrates gear unit 48 with a relatively large diameter package space, having its gearing located radially inside the motor's stator 62 and rotor 64. The electric motor drive unit 20 is described with reference to the embodiment of FIG. 1, but it could be applied also to the embodiment of FIG. 2.

The motor's stator 62 is secured to the housing 60, and the motor's rotor 64 is supported for rotation about a longitudinal axis 66, which is coaxial with the right half shaft 12 and left half shaft 14. A first planetary gearset 68 includes a sun gear 70 secured to rotor 64, a ring gear 72, a planet pinion carrier 74 fixed against rotation on the housing 60, and a set of planet pinions 76 supported for rotation on the carrier and meshing with the ring gear and sun gear.

A second planetary gearset 78 includes a sun gear 80 secured to carrier 74, a ring gear 82 fixed against rotation on housing 60, a planet pinion carrier, and a set of planet pinions 86 supported for rotation on carrier 84 and meshing with ring gear 82 and sun gear 80.

A double planetary differential gearset includes a sun gear 90 driveably connected to the left half shaft 14, a ring gear 92 secured to carrier 84, a planet pinion carrier 94 driveably connected to the right half shaft 12, a first set of planet pinions 96 supported for rotation on carrier 94 and meshing with ring gear 92, and a second set of planet pinions 98 supported for rotation on carrier 94 and meshing with sun gear 90 and the pinions 96 of the first set of planet pinions.

The rotor 64 drives sun gear 70, and the carrier 74 of the first gearset 68 is underdriven relative to the speed of the rotor. Similarly carrier 74 drives sun gear 80, and the carrier 84 of the second gearset 78 is underdriven relative to the speed of the carrier 74 and sun gear 80. Ring gear 92 of the differential gearset 88 is driven by carrier 84. The first output is carrier 94 and its half shaft 12; the second output is sun gear 90 and its half shaft 14.

Figure 4:
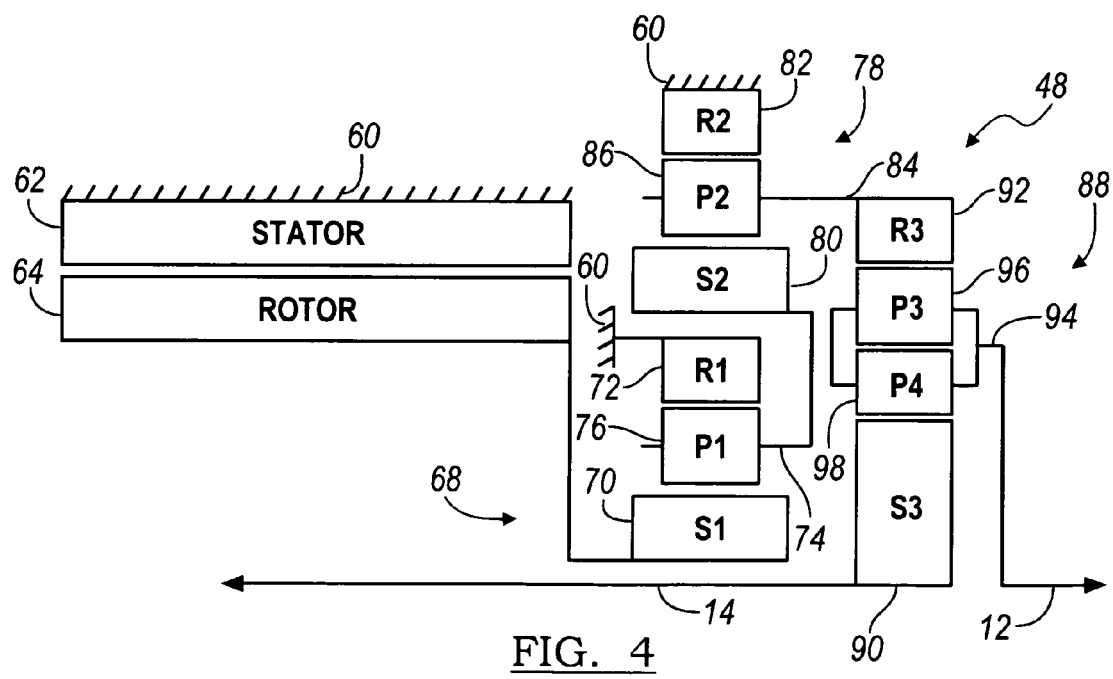
FIG. 4 is a cross section of the electric motor drive unit showing a second embodiment of the gear unit.

FIG. 4 illustrates gear unit 48 arranged to minimize its axial length by axially aligning gearsets 68, 78, and placing gearset 78 radial outboard of gearset 68. The interconnections among the components of gearsets 68, 78, 88 and the operation of the gearset are as described with reference to FIG. 3. In the embodiment of FIG. 4, gearset 78 may be located radially inboard of gearset 68.

Figure 5:
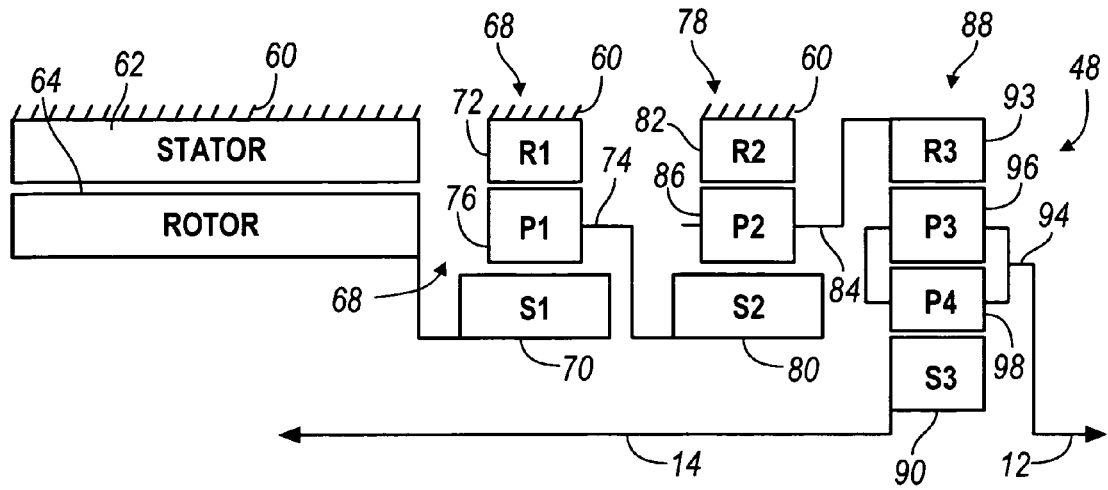
FIG. 5 is a cross section of the electric motor drive unit showing a third embodiment of the gear unit.

FIG. 5 illustrates gear unit 48 arranged to minimize its radial dimension by arranging the gearsets 68, 78, 88 axially sequentially, axially aligning the stator 62 and rotor 64, placing the stator and rotor axially adjacent the gearsets, and placing the rotor radially inboard of the stator. The interconnections among the components of gearsets 68, 78, 88 and the operation of the gearsets are as described with reference to FIG. 3.

Figure 6:
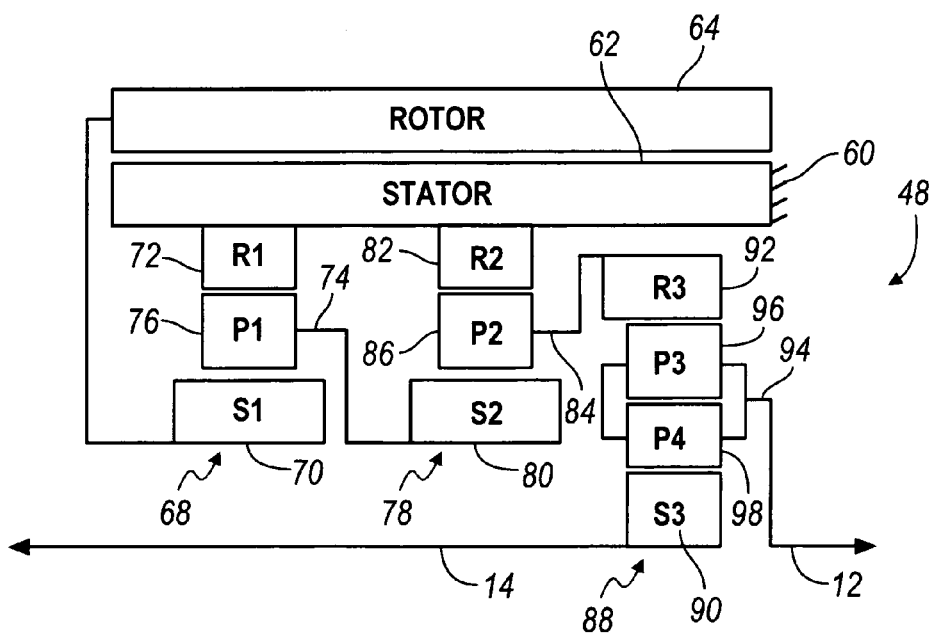
FIG. 6 is a cross section of the electric motor drive unit showing a fourth embodiment of the gear unit.

FIG. 6 illustrates gear unit 48 arranged to shorten its axial dimension by arranging the gearsets 68, 78, 88 axially sequentially, axially aligning the rotor 64 and stator 62, and locating the gearsets radially inboard of the stator and rotor. The interconnections among the components of gearsets 68, 78, 88 and the operation of the gearsets are as described with reference to FIG. 3, except that ring gears 72, 82 are secured to stator 62, which is fixed against rotation, preferably on the housing 60, and the rotor 64 is located radially outboard of the stator 62.

Locating the electric motor 46 and gear unit 48 in a single housing 60 facilitates replacing a conventional axle assembly with the electric motor drive unit 20. In this way, conventional rear-wheel drive and front-wheel drive powertrains can be used in combination with an electric motor drive unit to produce a hybrid electric drive system for a four-wheel drive vehicle.

In accordance with the provisions of the patent statutes, the preferred embodiment has been described. However, it should be noted that the alternate embodiments can be practiced otherwise than as specifically illustrated and described.

What is claimed is:

1. A drive unit for a motor vehicle, comprising:
   an electric motor;
   a first and second output shafts;
   a gear unit including first and second simple planetary gearsets, each gearset including a sun gear, a ring gear, a carrier, and a set of planet pinions supported on the carrier and engaged with the sun gear and the ring gear of the corresponding gearset, the ring gear of the first and second gearsets being fixed against rotation, each gearset each including an output and an input, the input of the first gearset being driveably connected to the motor, the output of the first gearset being driveably connected to the input of the second gearset; and
   a compound planetary differential gearset including an input driveably connected to the output of the second gearset, a first differential output driveably connected to the first output shaft, and a second differential output driveably connected to the second output shaft.

2. The drive unit of claim 1 wherein:
   the sun gear of the first gear set is driveably connected to the motor; and
   the carrier of the first gearset is driveably connected to the sun gear of the second gearset.

3. The drive unit of claim 1 wherein the compound planetary differential gearset includes:
   a sun gear;
   a ring gear driveably connected to the carrier of the second gearset;
   a carrier;
   a first set of planet pinions supported on the carrier and engaged with the sun gear; and
   a second set of planet pinions supported on the carrier and engaged with the ring gear and the pinions of the first set of planet pinions.

4. The drive unit of claim 1 wherein the compound planetary differential gearset includes:
   a sun gear;
   a ring gear driveably connected to the carrier of the second gearset;
   a carrier;
   a first set of planet pinions supported on the carrier and engaged with the sun gear;
   a second set of planet pinions supported on the carrier and engaged with the ring gear and the pinions of the first set of planet pinions, the carrier is driveably connected to the first output shaft, and the sun gear is driveably connected to the second output shaft.

5. A drive unit for a motor vehicle, comprising:
   an electric motor including a stator secured against rotation and a rotor aligned with the stator such that one of the stator and rotor is located radially inboard of the other of the stator and rotor;
   a first and second output shafts;

a gear unit located radially inboard of the rotor and stator, the gear unit including first and second simple planetary gearsets, each gearset including a sun gear, a ring gear, a carrier, and a set of planet pinions supported on the carrier and engaged with the sun gear and the ring gear of the corresponding gearset, the ring gear of the first and second gearsets being fixed against rotation, each gearset each including an output and an input, the input of the first gearset being driveably connected to the rotor, the output of the first gearset being driveably connected to the input of the second gearset; and a compound planetary differential gearset including an input driveably connected to the output of the second gearset, a first differential output driveably connected to the first output shaft, and a second differential output driveably connected to the second output shaft.

6. The drive unit of claim 5 wherein the first gear set is located axially spaced from the second gear set and the differential gearset is axially spaced from the second gearset.

7. The drive unit of claim 5 wherein:
the sun gear of the first gear set is driveably connected to the rotor; and
the carrier of the first gearset is driveably connected to the sun gear of the second gearset.

8. The drive unit of claim 5 wherein:
the ring gear of the first gearset and the ring gear of the second gearset are secured to the stator.

9. The drive unit of claim 5 wherein the compound planetary differential gearset includes:
a sun gear;
a ring gear driveably connected to the carrier of the second gearset;
a carrier;
a first set of planet pinions supported on the carrier and engaged with the sun gear; and
a second set of planet pinions supported on the carrier and engaged with the ring gear and the pinions of the first set of planet pinions.

10. The drive unit of claim 5 wherein the compound planetary differential gearset includes:
a sun gear;
a ring gear driveably connected to the carrier of the second gearset;
a carrier;
a first set of planet pinions supported on the carrier and engaged with the sun gear;
a second set of planet pinions supported on the carrier and engaged with the ring gear and the pinions of the first set of planet pinions, the carrier is driveably connected to the first output shaft, and the sun gear is driveably connected to the second output shaft.

11. A drive unit for a motor vehicle, comprising:
an electric motor including a stator secured against rotation, and a rotor aligned with the stator such that one of the stator and rotor is located radially inboard of the other of the stator and rotor;
a first and second output shafts;

a gear unit spaced axially from the rotor and stator, the gear unit including first and second simple planetary gearsets, each gearset including a sun gear, a ring gear, a carrier, and a set of planet pinions supported on the carrier and engaged with the sun gear and the ring gear of the corresponding gearset, the ring gear of the first and second gearsets being fixed against rotation, each gearset including an output and an input, the input of the first gearset being driveably connected to the rotor, the output of the first gearset being driveably connected to the input of the second gearset; and a compound planetary differential gearset including an input driveably connected to the output of the second gearset, a first differential output driveably connected to the first output shaft, and a second differential output driveably connected to the second output shaft.

12. The drive unit of claim 11 wherein the first gear set is aligned axially with the second gearset, and the differential gearset is axially spaced from the first and second gearsets.

13. The drive unit of claim 11 wherein the first gear set is spaced axially from the second gearset, and the differential gearset is axially spaced from the first and second gearsets.

14. The drive unit of claim 11 wherein:
the sun gear of the first gear set is driveably connected to the rotor; and
the carrier of the first gearset is driveably connected to the sun gear of the second gearset.

15. The drive unit of claim 11 wherein:
the ring gear of the first gearset and the ring gear of the second gearset are secured to the stator.

16. The drive unit of claim 11 wherein the compound planetary is differential gearset includes:
a sun gear;
a ring gear driveably connected to the carrier of the second gearset;
a carrier;
a first set of planet pinions supported on the carrier and engaged with the sun gear; and
a second set of planet pinions supported on the carrier and engaged with the ring gear and the pinions of the first set of planet pinions.

17. The drive unit of claim 11 wherein the compound planetary differential gearset includes:
a sun gear;
a ring gear driveably connected to the carrier of the second gearset;
a carrier;
a first set of planet pinions supported on the carrier and engaged with the sun gear;
a second set of planet pinions supported on the carrier and engaged with the ring gear and the pinions of the first set of planet pinions, the carrier is driveably connected to the first output shaft, and the sun gear is driveably connected to the second output shaft.

* * * * *